(12) United States Patent
Carnevali

(10) Patent No.: US 10,448,626 B2
(45) Date of Patent: Oct. 22, 2019

(54) FISHING ROD HOLDER WITH A TOP MOUNT RECEPTACLE FOR RECEIVING A DEVICE MOUNT

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 240 days.

(21) Appl. No.: 15/650,726

(22) Filed: Jul. 14, 2017

(65) Prior Publication Data

US 2019/0014767 A1    Jan. 17, 2019

(51) Int. Cl.
| A01K 97/10 | (2006.01) |
| A01K 91/08 | (2006.01) |
| A01K 97/00 | (2006.01) |

(52) U.S. Cl.
CPC .............. *A01K 97/10* (2013.01); *A01K 91/08* (2013.01); *A01K 97/00* (2013.01)

(58) Field of Classification Search
CPC ................................ A01K 97/10; A01K 97/00
USPC ...................................................... 43/21.2, 25
See application file for complete search history.

(56) References Cited

U.S. PATENT DOCUMENTS

| 180,881 A | 8/1876 | Howson |
| 538,534 A | 4/1895 | Neill |
| 596,729 A | 1/1898 | White |
| 842,007 A | 1/1907 | Parker |
| 855,149 A | 5/1907 | Vaughn et al. |
| 890,656 A | 6/1908 | Johnson |
| 892,105 A | 6/1908 | White |
| 958,052 A | 5/1910 | Williams |
| 1,009,913 A | 11/1911 | Maguire et al. |
| 1,280,013 A | 9/1918 | Goddard |
| 1,359,645 A | 11/1920 | Zink |
| 1,455,441 A | 5/1923 | Hodny |
| 1,509,068 A | 9/1924 | Herron |
| 1,934,223 A | 11/1933 | Booth |
| 2,029,089 A | 1/1936 | Weirauch |
| 2,114,767 A | 4/1938 | Hodny et al. |
| 2,121,317 A | 6/1938 | Cohen |
| D142,057 S | 8/1945 | Baxter |
| 2,560,556 A | 7/1951 | Creedon |
| 2,650,788 A | 9/1953 | Hulstein |

(Continued)

OTHER PUBLICATIONS

U.S. Appl. No. 15/612,764, filed Jun. 2, 2017.

(Continued)

*Primary Examiner* — Christopher P Ellis
(74) *Attorney, Agent, or Firm* — Lowe Graham Jones PLLC; Bruce E. Black

(57) ABSTRACT

A fishing rod holder includes a mounting arrangement configured to either be received by a mounting apparatus or to mount to a surface. A rod retainer is coupled to the mounting arrangement. The rod retainer includes at least one retaining wall having an outer surface and defining an inner cavity configured to receive and hold a portion of a fishing rod. A top mount receptacle is configured to receive a device mount. The top mount receptacle includes a base disposed on the outer surface of the rod retainer. The base includes a mounting surface configured for receiving a portion of the device mount.

20 Claims, 12 Drawing Sheets

(56) References Cited

U.S. PATENT DOCUMENTS

| | | | |
|---|---|---|---|
| 2,688,504 A | 9/1954 | Parker | |
| 2,710,609 A | 6/1955 | Giller | |
| 2,723,823 A | 11/1955 | Polk | |
| 2,752,173 A | 6/1956 | Krooss | |
| 2,859,710 A | 11/1958 | Elsner | |
| 2,861,501 A | 11/1958 | Strelakos | |
| 3,051,422 A * | 8/1962 | Crump | A01K 97/10 248/299.1 |
| 3,089,674 A * | 5/1963 | Bastie | A01K 97/10 248/214 |
| 3,096,061 A | 7/1963 | Bertell | |
| 3,154,274 A * | 10/1964 | Hillcourt | A01K 97/10 248/534 |
| 3,252,677 A | 5/1966 | Raymond | |
| 3,304,038 A | 2/1967 | Guthrie | |
| 3,560,969 A * | 2/1971 | Fleeman | A01K 97/10 43/16 |
| 3,570,793 A * | 3/1971 | Shackel | A01K 97/10 248/205.1 |
| 3,605,637 A | 9/1971 | Prete, Jr. | |
| 3,652,050 A | 3/1972 | Marrujo et al. | |
| 3,667,708 A * | 6/1972 | Smeltzer | A01K 97/10 220/735 |
| 3,779,502 A | 12/1973 | Marberg | |
| 3,843,272 A | 10/1974 | Jorn | |
| 3,966,151 A * | 6/1976 | Hawkins, III | A01K 97/10 43/21.2 |
| 4,060,241 A | 11/1977 | Hegel | |
| 4,060,331 A | 11/1977 | Domer et al. | |
| 4,066,231 A | 1/1978 | Bahner | |
| 4,066,311 A | 1/1978 | Poulson | |
| D247,420 S | 3/1978 | Reynolds | |
| 4,085,684 A | 4/1978 | McLennan et al. | |
| 4,183,387 A | 1/1980 | Lenz | |
| 4,205,486 A | 6/1980 | Guarnacci | |
| 4,222,680 A | 9/1980 | Browning | |
| 4,225,258 A | 9/1980 | Thompson | |
| 4,307,864 A | 12/1981 | Benoit | |
| 4,461,284 A | 7/1984 | Fackler | |
| 4,491,435 A | 1/1985 | Meier | |
| 4,585,197 A | 4/1986 | Liautaud et al. | |
| 4,611,839 A | 9/1986 | Rung et al. | |
| 4,620,813 A | 11/1986 | Lacher | |
| 4,641,986 A | 2/1987 | Tsui et al. | |
| 4,677,794 A | 7/1987 | Parron et al. | |
| 4,688,843 A | 8/1987 | Hall | |
| 4,796,508 A | 1/1989 | Hoshino | |
| 4,800,795 A | 1/1989 | Yamashita | |
| 4,805,784 A | 2/1989 | Solheim et al. | |
| 4,842,308 A | 6/1989 | Spotts | |
| 4,872,630 A | 10/1989 | Cooper | |
| 4,901,970 A * | 2/1990 | Moss | A01K 97/10 224/282 |
| 4,950,099 A | 8/1990 | Roellin | |
| 5,071,279 A | 12/1991 | Rutstrom | |
| 5,092,551 A | 3/1992 | Meier | |
| 5,109,321 A | 4/1992 | Maglica et al. | |
| 5,118,058 A | 6/1992 | Richter | |
| 5,241,796 A | 9/1993 | Hellwig et al. | |
| 5,251,859 A | 10/1993 | Cyrell et al. | |
| 5,259,711 A | 11/1993 | Beck | |
| 5,270,911 A | 12/1993 | Maglica et al. | |
| 5,284,098 A | 2/1994 | Klapperich et al. | |
| 5,305,700 A | 4/1994 | Strong et al. | |
| 5,419,522 A | 5/1995 | Luecke et al. | |
| 5,441,225 A | 8/1995 | Hall | |
| 5,564,668 A | 10/1996 | Crowe, II | |
| 5,628,597 A | 5/1997 | Chudoba et al. | |
| 5,727,858 A | 3/1998 | Shapiro | |
| 5,823,724 A | 10/1998 | Lee | |
| 5,845,885 A | 12/1998 | Carnevali | |
| 6,082,688 A * | 7/2000 | Wilson | A01K 97/10 248/222.11 |
| 6,173,926 B1 | 1/2001 | Elvegaard | |
| 6,308,642 B1 | 10/2001 | Branam et al. | |
| 6,561,476 B2 | 5/2003 | Carnevali | |
| 6,581,892 B2 | 6/2003 | Carnevali | |
| 6,588,722 B2 | 7/2003 | Eguchi et al. | |
| 6,666,420 B1 | 12/2003 | Carnevali | |
| 6,688,568 B1 | 2/2004 | Moufflet | |
| 6,695,183 B2 | 2/2004 | Hancock et al. | |
| 6,789,988 B1 | 9/2004 | Moradians | |
| 6,846,140 B2 | 1/2005 | Anderson et al. | |
| 6,902,089 B2 | 6/2005 | Carnevali | |
| 6,945,414 B1 | 9/2005 | Stevens et al. | |
| 7,090,181 B2 | 8/2006 | Biba et al. | |
| 7,100,808 B2 | 9/2006 | Hancock et al. | |
| 7,159,998 B2 | 1/2007 | Moreland | |
| D539,639 S | 4/2007 | Nagle | |
| 7,277,240 B2 | 10/2007 | Carnevali | |
| 7,320,450 B2 | 1/2008 | Carnevali | |
| D563,781 S | 3/2008 | Carnevali | |
| D564,062 S | 3/2008 | Carnevali | |
| 7,337,934 B2 | 3/2008 | Alling et al. | |
| 7,389,608 B1 * | 6/2008 | MacKay | A01K 97/05 206/315.11 |
| 7,401,995 B2 | 7/2008 | Senakiewich, II | |
| 7,422,184 B2 | 9/2008 | Carnevali | |
| D588,903 S | 3/2009 | Carnevali | |
| D589,327 S | 3/2009 | Carnevali | |
| D590,696 S | 4/2009 | Carnevali | |
| 7,523,904 B2 | 4/2009 | Carnevali | |
| 7,551,458 B2 | 6/2009 | Carnevali | |
| 7,556,463 B1 | 7/2009 | Hall | |
| 7,571,522 B2 | 8/2009 | Carnevali | |
| 7,607,622 B2 | 10/2009 | Carnevali | |
| 7,682,543 B2 | 3/2010 | Carnevali | |
| 7,731,140 B2 | 6/2010 | Carnevali | |
| 7,774,973 B2 | 8/2010 | Carnevali | |
| D629,080 S | 12/2010 | Dole et al. | |
| 7,849,630 B2 | 12/2010 | Carnevali | |
| 7,850,133 B2 | 12/2010 | Carnevali | |
| 7,854,204 B2 | 12/2010 | Dacus | |
| RE42,060 E | 1/2011 | Carnevali | |
| 7,887,018 B2 | 2/2011 | Carnevali | |
| 7,950,701 B2 | 5/2011 | Dole et al. | |
| 7,954,773 B2 | 6/2011 | Carnevali | |
| 7,975,971 B2 | 7/2011 | Carnevali | |
| 7,980,798 B1 | 7/2011 | Kuehn et al. | |
| RE42,581 E | 8/2011 | Carnevali | |
| 7,988,106 B2 | 8/2011 | Carnevali | |
| 8,020,828 B2 | 9/2011 | Carnevali | |
| 8,037,904 B2 | 10/2011 | Carnevali | |
| 8,156,681 B2 | 4/2012 | Carnevali | |
| 8,201,788 B2 | 6/2012 | Carnevali | |
| 8,235,340 B2 | 8/2012 | Carnevali | |
| RE43,806 E | 11/2012 | Carnevali | |
| 8,322,955 B2 | 12/2012 | Arnesen et al. | |
| 8,408,853 B2 | 4/2013 | Womack et al. | |
| 8,454,178 B2 | 6/2013 | Carnevali | |
| 8,505,861 B2 | 8/2013 | Carnevali | |
| 8,534,519 B2 | 9/2013 | Hancock et al. | |
| 8,590,855 B2 | 11/2013 | Carnevali | |
| 8,651,289 B2 | 2/2014 | Diaz, Jr. et al. | |
| 8,776,698 B2 | 7/2014 | Pherson | |
| 8,992,238 B2 | 3/2015 | Chinn | |
| 9,056,580 B2 | 6/2015 | Baldsiefen et al. | |
| 9,180,925 B2 | 11/2015 | Carnevali | |
| 9,253,970 B2 | 2/2016 | Carnevali | |
| 9,365,150 B2 | 6/2016 | Baldsiefen et al. | |
| 9,379,504 B2 | 6/2016 | Chinn | |
| 9,623,787 B2 | 4/2017 | Sterling | |
| 9,671,060 B1 | 6/2017 | Cifers | |
| 9,828,073 B1 | 11/2017 | Cifers, III | |
| 9,944,217 B2 | 4/2018 | Schroeder et al. | |
| 9,975,466 B2 | 5/2018 | Hendren et al. | |
| 9,987,993 B2 | 6/2018 | Thorimbert | |
| 2003/0042282 A1 | 3/2003 | Gates et al. | |
| 2003/0185008 A1 | 10/2003 | Moreland | |
| 2004/0178309 A1 | 9/2004 | Crowley et al. | |
| 2005/0036848 A1 | 2/2005 | Cunningham et al. | |
| 2005/0092876 A1 | 5/2005 | Carnevali | |

(56) References Cited

U.S. PATENT DOCUMENTS

| | | | |
|---|---|---|---|
| 2005/0102882 A1* | 5/2005 | Williams | A01K 97/10 43/21.2 |
| 2005/0132937 A1 | 6/2005 | Branam | |
| 2006/0000957 A1 | 1/2006 | Carnevali | |
| 2006/0102823 A1 | 5/2006 | Carnevali | |
| 2008/0115344 A1 | 5/2008 | Carnevali | |
| 2008/0148621 A1* | 6/2008 | Laser | A01K 87/007 43/4 |
| 2008/0296334 A1 | 12/2008 | Carnevali | |
| 2009/0014584 A1 | 1/2009 | Rudduck et al. | |
| 2009/0095206 A1 | 4/2009 | Dacus | |
| 2009/0108151 A1 | 4/2009 | Carnevali | |
| 2009/0108152 A1 | 4/2009 | Carnevali | |
| 2009/0140112 A1 | 6/2009 | Carnevali | |
| 2009/0241293 A1 | 10/2009 | Swerdlick | |
| 2010/0237219 A1* | 9/2010 | Edwards | A01K 97/10 248/537 |
| 2010/0282802 A1 | 11/2010 | Carnevali | |
| 2010/0284199 A1 | 11/2010 | Carnevali | |
| 2010/0288843 A1 | 11/2010 | Arnesen et al. | |
| 2011/0097177 A1 | 4/2011 | Carnevali | |
| 2011/0154714 A1* | 6/2011 | Rieck | A01K 97/10 43/21.2 |
| 2011/0308131 A1* | 12/2011 | McLinda | A01K 97/10 42/94 |
| 2012/0006948 A1 | 1/2012 | Hiss et al. | |
| 2012/0181409 A1 | 7/2012 | Hayahara et al. | |
| 2012/0217353 A1 | 8/2012 | Hennon | |
| 2012/0318937 A1 | 12/2012 | Carnevali | |
| 2013/0133158 A1 | 5/2013 | Tran | |
| 2014/0003878 A1 | 1/2014 | Knox et al. | |
| 2014/0034794 A1 | 2/2014 | Carnevali | |
| 2014/0226315 A1 | 8/2014 | Nicieja et al. | |
| 2014/0248103 A1 | 9/2014 | Baldsiefen et al. | |
| 2015/0030386 A1 | 1/2015 | Carnevali | |
| 2015/0275942 A1 | 10/2015 | Carnevali | |
| 2016/0288691 A1 | 10/2016 | Aubrey et al. | |
| 2017/0209318 A1 | 7/2017 | Schroeder et al. | |
| 2017/0231209 A1* | 8/2017 | Pippins | A01K 97/00 43/17 |

OTHER PUBLICATIONS

U.S. Appl. No. 15/612,798, filed Jun. 2, 2017.
U.S. Appl. No. 15/627,102, filed Jun. 19, 2017.
U.S. Appl. No. 15/650,732, filed Jul. 14, 2017.
Yakattack.us, 7 pages of product description of GearTrac retrieved from web site at: www.yakattack.us/by-product-name/geartrac/ on Sep. 19, 2017.
Yakattack.us, 4 pages of product description of GTTL retrieved from web site at: www.yakattack.us/geartrac/gttl/ on Sep. 19, 2017.
Yakattack.us, 6 pages of product description of GTSL90 retrieved from web site at: www.yakattack.us/by-product-name/geartrac/gtsl90/ on Sep. 19, 2017.
Yakattack.us, 5 pages of product description of GT90 retrieved from web site at: www.yakattack.us/geartrac/gt90/ on Sep. 19, 2017.
Yakattack.us, 4 pages of product description of GT175 retrieved from web site at: www.yakattack.us/geartrac/gt175/ on Sep. 19, 2017.

* cited by examiner

FISHING ROD HOLDER WITH A TOP MOUNT RECEPTACLE FOR RECEIVING A DEVICE MOUNT

FIELD

The present invention is directed to the area of holders for fishing rods. The present invention is also directed to a fishing rod holder with a top mount receptacle suitable for receiving a device mount.

BACKGROUND

Providing mounts for holding, retaining, or securing objects has proven beneficial for many different uses. Some mountable-objects, such as electronic devices (e.g., phones, laptops, tablets, fish finders, positioning devices, music players, cameras, or the like), are increasingly used in situations where mounting the object to a surface increases the convenience, or enhances the experience, of using the object. For example, in the case of hand-held devices, device mounts eliminate the need to hold the device, or prop the device up, in order to use the device, thereby allowing a user to use the device, while simultaneously engaging in other activities which may benefit from the use of both hands without the encumberment of holding or propping-up the device. In some instances, mounting the device may increase user safety by enabling use of the device, without the distraction of holding the device.

BRIEF SUMMARY

In one embodiment, a fishing rod holder includes a mounting arrangement configured to either be received by a mounting apparatus or to mount to a surface. A rod retainer is coupled to the mounting arrangement. The rod retainer includes at least one retaining wall having an outer surface and defining an inner cavity configured to receive and hold a portion of a fishing rod. A top mount receptacle is configured to receive a device mount. The top mount receptacle includes a base disposed on the outer surface of the rod retainer. The base includes a mounting surface configured for receiving a portion of the device mount.

In at least some embodiments, the top mount receptacle defines a retention aperture extending from the mounting surface into the base, the retention aperture configured to receive a portion of the device mount. In at least some embodiments, the retention aperture includes a polygonal basin configured to resist rotation of the device mount relative to the top mount receptacle when the device mount is received by the retention aperture.

In at least some embodiments, the top mount receptacle further includes two rails extending opposite each other from the base, the two rails laterally spaced apart from each other by a first distance. In at least some embodiments, the top mount receptacle further includes two beams, where each of the beams has a top surface and an opposing bottom surface, where each of the beams extends from a different one of the rails over the base toward the other beam, and where the beams are laterally spaced apart from each other by a second distance that is smaller than the first distance. In at least some embodiments, the top mount receptacle defines a retention aperture extending from the mounting surface into the base, the retention aperture configured to receive the retention element of the device mount.

In another embodiment, a fishing-rod-holder kit includes the fishing rod holder described above and a device mount configured to mount to the top mount receptacle of the fishing rod holder. The device mount includes a retention element configured to removably couple with the top mount receptacle of the fishing rod holder and a mounting element coupleable to the retention element.

In at least some embodiments, the retention element is configured to form a snap-fit coupling with the top mount receptacle. In at least some embodiments, the retention element is configured to slide over the mounting surface of the top mount receptacle between the two rails with a portion of the retention element disposed beneath the bottom surfaces of the two beams of the top mount receptacle.

In at least some embodiments, the retention element includes a flange with two flexible arms extending from the flange, the two flexible arms each configured to flex inwardly from an unflexed position towards the other flexible arm during coupling of the retention element with the top mount receptacle, the inward flexing of the two flexible arms enabling the retention element to slide over the mounting surface of the top mount receptacle between the two rails. In at least some embodiments, the flexible arms are biased to remain in the unflexed position absent application of a force to the flexible arms. In at least some embodiments, the flexible arms are in the unflexed position when the retention element is received by top mount receptacle.

In at least some embodiments, the top mount receptacle defines a retention aperture extending from the mounting surface into the base, the retention aperture configured to receive the retention element of the device mount. In at least some embodiments, the device mount further includes a device-mount base configured to insert into the retention aperture of the device mount and to receive the retention element. In at least some embodiments, the mounting element is a ball mount.

In yet another embodiment, a method of mounting a device mount to a fishing rod holder includes providing the fishing-rod-holder kit described above; and sliding the retention element of the device mount along the mounting surface of the base between the two rails to retain a portion of the retention element between the mounting surface, the two rails, and the bottom surfaces of the two beams. In at least some embodiments, sliding the retention element of the device mount along the mounting surface of the base between the two rails comprises forming a snap-fit coupling between the retention element and the top mount receptacle.

In still yet another embodiment, a fishing-rod-holder kit includes the fishing rod holder described above and a device mount configured to mount to the top mount receptacle of the fishing rod holder. The device mount includes a retention element configured to extend into the retention aperture of the fishing rod holder and a mounting element coupleable to the device-mount base. In at least some embodiments, the device mount further includes a device-mount base configured to insert into the retention aperture of the device mount and to receive the retention element.

In another embodiment, a method of mounting a device mount to a fishing rod holder includes providing the fishing-rod-holder kit described above; and inserting the retention element of the device mount into the retention aperture of the top mount receptacle.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of holders for fishing rods. The present invention is also directed to a fishing rod holder with a top mount receptacle suitable for receiving a device mount.

A fishing rod holder with a top mount receptacle enables a device mount to be mounted to the fishing rod holder. The device mount can include any suitable type of mounting element, such as mounting elements for receiving electronic devices (e.g., cameras, phones, laptops, tablets, fish finders, positioning devices, music players, or the like); as well as other general-purpose or specialty mounting elements (e.g., ball mounts, drink-holder mounts, or the like). A fishing-rod-holder kit, or assembly, can include a fishing rod holder (with a top mount) and a device mount.

The top mount receptacle includes a base disposed along the fishing rod holder. In some embodiments, the top mount receptacle receives device mounts with retention elements suitable for sliding onto the base between opposing rails. In some embodiments, the top mount receptacle receives device mounts with retention elements suitable for forming a biased coupling (e.g., snap-fit, spring-loaded, or the like) with the top mount receptacle. In some embodiments, the top mount receptacle receives device mounts with retention elements suitable for inserting into a retention aperture defined in the base. In at least some embodiments, the top mount receptacle is configured to receive device mounts having either retention elements suitable for sliding onto the base between opposing rails or retention elements suitable for inserting into a retention aperture defined in the base. In some embodiments, the top mount receptacle receives device mounts with retention elements suitable for forming interference fits with the top mount receptacle.

Figure 1:
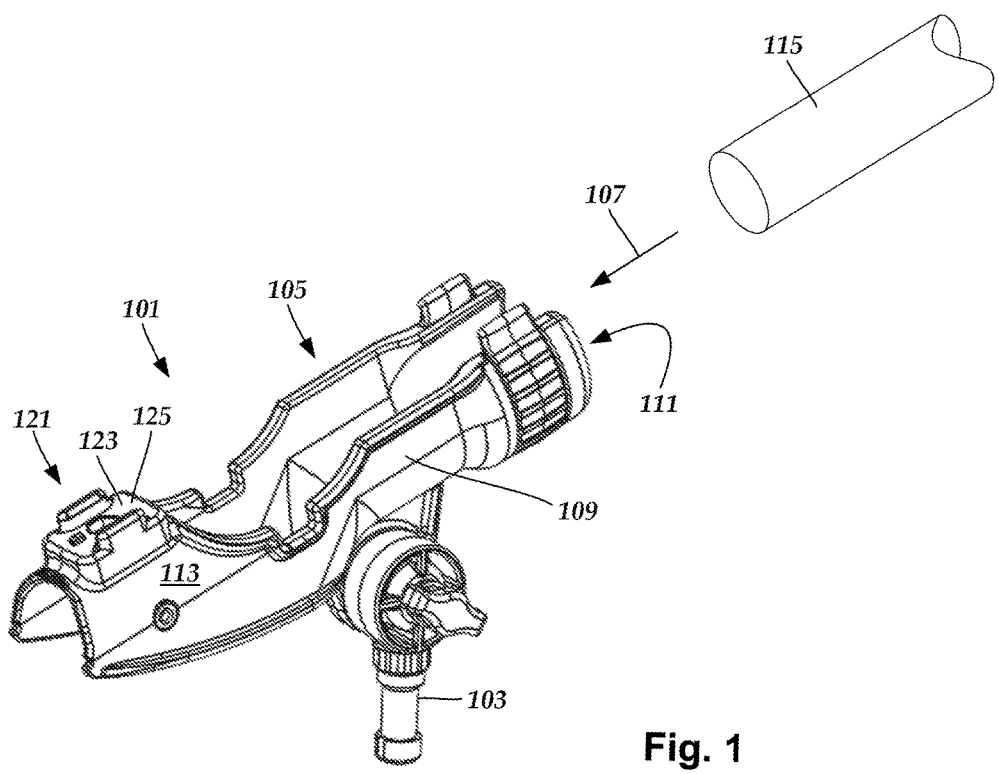
FIG. 1 is a schematic perspective view of one embodiment of a fishing rod holder with a top mount receptacle and a portion of a fishing rod suitable for disposing in the fishing rod holder, according to the invention.

FIG. 1 shows, in perspective view, one embodiment of a fishing rod holder 101 and an end portion of a fishing rod 115 suitable for disposing in the fishing rod holder 101, as shown by directional arrow 107. The fishing rod holder 101 includes a mounting arrangement 103 suitable for mounting the fishing rod holder 101 to a surface (e.g., a vehicle surface, a dock, a pole, a countertop, a railing, a gunwale, a cabinet, a table, a floor, a wall, a ceiling, a ledge, a mounting track, or the like) or to a mounting apparatus (e.g., a structure with a socket configured for receiving the mounting arrangement).

The fishing rod holder 101 also includes a rod retainer 105 coupled to the mounting arrangement 103, either directly or indirectly. In at least some embodiments, the rod retainer 105 is pivotably coupled to the mounting arrangement 103. In at least some embodiments, the rod retainer 105 is rotatable about a longitudinal axis of the mounting arrangement 103. The rod retainer 105 includes at least one retaining wall 109 defining an inner cavity 111 suitable for receiving and holding a portion of the fishing rod 115.

A top mount receptacle 121 is disposed along an outer surface 113 of the rod retainer 105 and is configured to receive a device mount. The top mount receptacle includes a base 123 having a mounting surface 125 upon which a portion of a device mount is received and removably retained. Receiving and removably retaining a device mount by the top mount receptacle 121 enables one or more devices to be mounted to the fishing rod holder.

Turning to FIG. 2A-4C, in some embodiments the top mount receptacle is configured to receive device mounts by sliding the device mounts relative to the top mount receptacle in a direction that is parallel to the mounting surface of the base. In at least some embodiments, the device mounts are retained by the top mount receptacle by a snap-fit coupling.

Figure 2A:
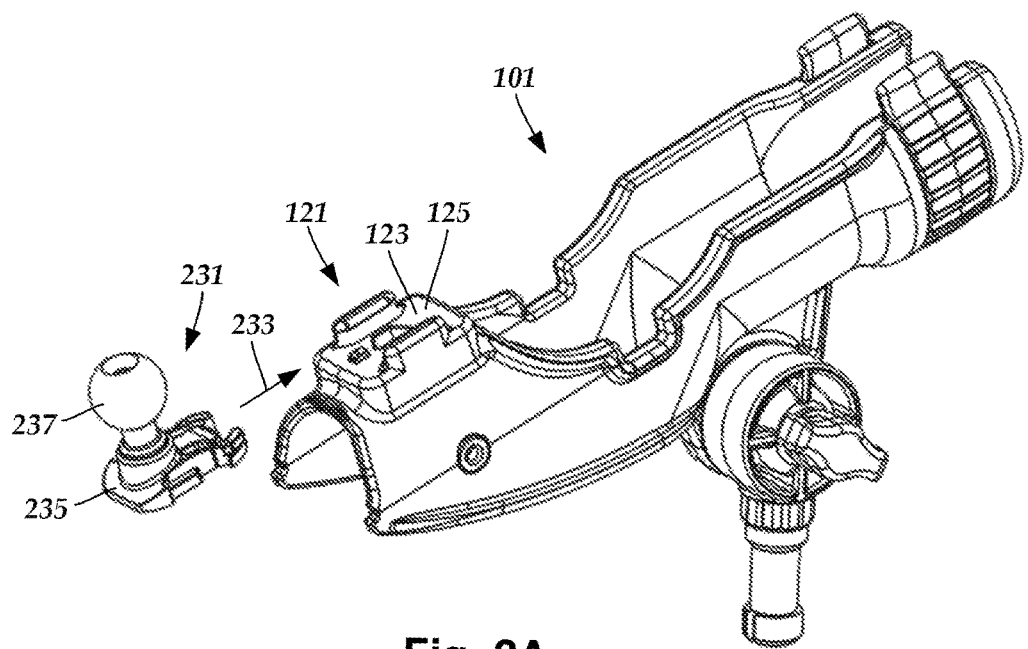
FIG. 2A is a schematic perspective view of one embodiment of the fishing rod holder of FIG. 1 and a device mount suitable for being received by the top mount receptacle of the fishing rod holder by sliding a retention element of the device mount into the top mount receptacle, according to the invention.
Figure 2B:
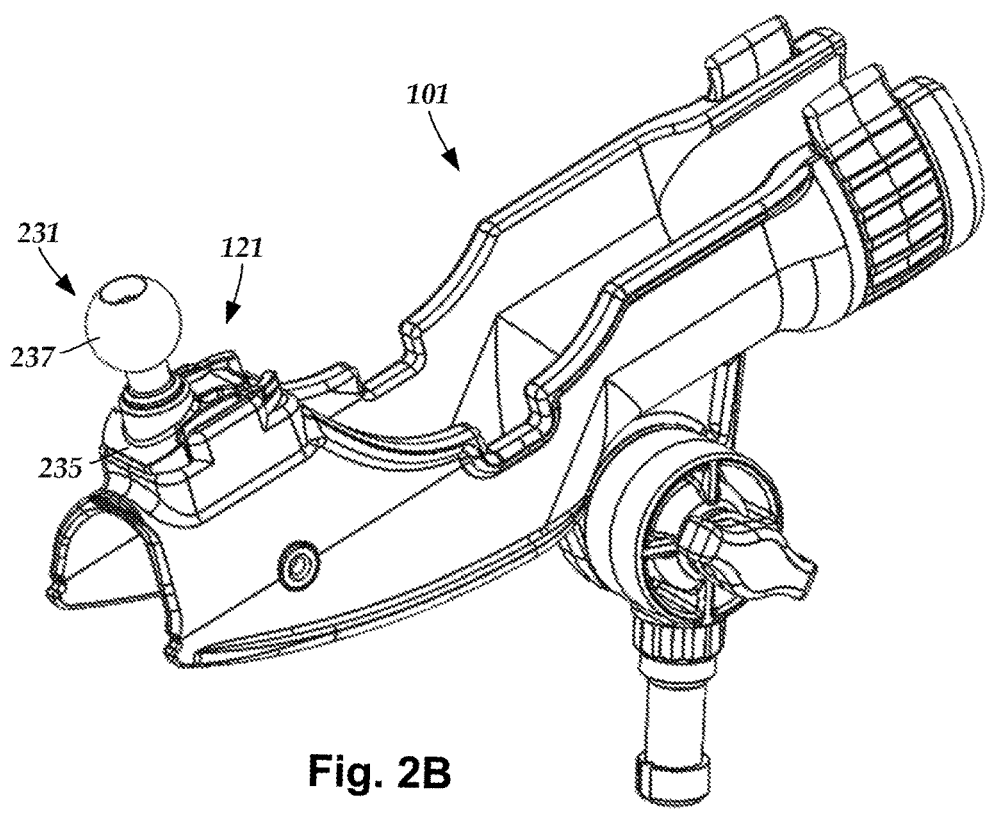
FIG. 2B is a schematic perspective view of one embodiment of the device mount of FIG. 2A received by the top mount receptacle of the fishing rod holder of FIG. 1, according to the invention.

FIG. 2A shows, in perspective view, one embodiment of the fishing rod holder 101 and a device mount 231 suitable for mounting to the top mount receptacle 121 of the fishing rod holder 101 by sliding the device mount 231 relative to the top mount receptacle 121 in a direction that is parallel to the mounting surface 125 of the base 123, as indicated by directional arrow 233. FIG. 2B shows, in perspective view, one embodiment of the device mount 231 received by the top mount receptacle 121 of the fishing rod holder 101.

The device mount 231 includes a retention element 235 coupled to a mounting element 237. As shown in FIGS. 2A-2B, the retention element 235 is received by the top mount receptacle 121. In FIGS. 2A-2B (and in other figures), the mounting element 237 is formed as a ball mount.

Figure 3:
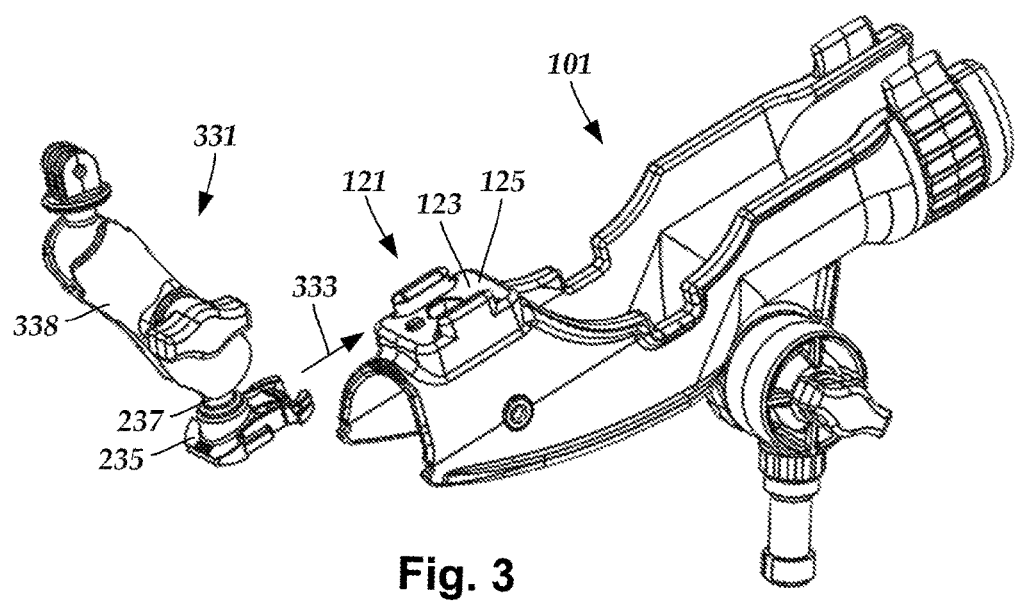
FIG. 3 is a schematic perspective view of one embodiment of the fishing rod holder of FIG. 1 and the device mount of FIG. 2A with an attachment arm coupled to the device mount, according to the invention.

FIG. 3 shows, in perspective view, one embodiment of the fishing rod holder 101 and a device mount 331 suitable for mounting to the top mount receptacle 121 of the fishing rod holder 101 by sliding the device mount 331 relative to the top mount receptacle 121 in a direction that is parallel to the mounting surface 125 of the base 123, as indicated by directional arrow 333.

The device mount 331 includes the retention element 235 coupled to the mounting element 237. The retention element 235 is configured for being received by the top mount receptacle 121. The device mount 331 may, optionally, include one or more attachments coupled to the mounting element 237. In FIG. 3 (and in other figures), an attachment arm 338 is shown coupled to the mounting element 237. The attachment arm 338 can be used to couple to one or more items, such as an electronic devices electronic device (e.g., camera, phone, laptop, tablet, fish finder, positioning device, music player, or the like).

Figure 4A:
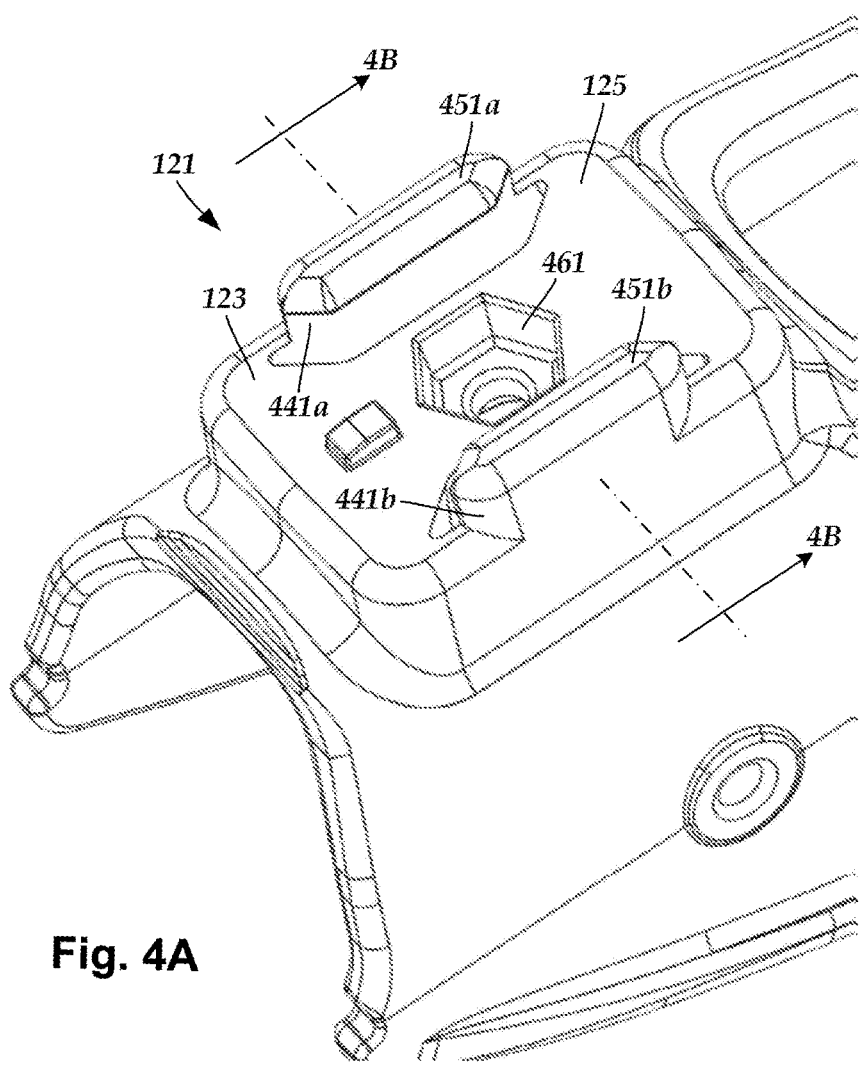
FIG. 4A is a schematic close-up perspective view of one embodiment of the top mount receptacle of FIG. 1, according to the invention.
Figure 4B:
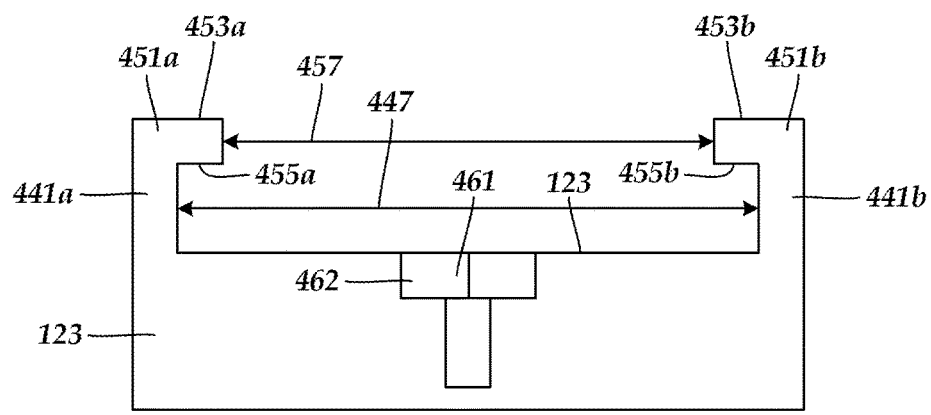
FIG. 4B is a schematic cross-sectional view of one embodiment of the top mount receptacle of FIG. 4A, according to the invention.

FIG. 4A shows, in close-up perspective view, one embodiment of the top mount receptacle 121. FIG. 4B shows a cross-sectional view of the top mount receptacle 121. The top mount receptacle 121 includes the base 123 having the mounting surface 125 upon which a device mount (e.g., 231 of FIGS. 2A-2B; 331 of FIG. 3) is received and removably retained. Two rails 441a, 441b extend opposite each other from the base 123. Two beams 451a, 451b extend from the rails 441a, 441b, respectively, over the base 123 towards each other.

The rails 441a, 441b are laterally spaced apart from each other by a first gap having a first distance 447. The beams 451a, 451b each include a top surface 453a, 453b, respectively, and an opposing bottom surface 455a, 455b, respectively. The beams 451a, 451b are laterally spaced apart from each other by a second gap having a second distance 457 that is smaller than the first distance 447.

A retention aperture 461 is defined in the mounting surface 125 and extends into the base 123. The retention aperture 461, optionally, extends through the retaining wall 109 of the fishing rod holder 101 and into the inner cavity 111. In at least some embodiments, the retention aperture 641 includes a multi-sided basin 462 configured to resist rotation of a device mount relative to the top mount receptacle 121 in embodiments where the retention element of the device mount is inserted into the retention aperture 641. The multi-sided based 462 can be polygonal, with either regular or irregular sides. In the illustrated embodiment, the multi-sided basin includes six-sides (e.g, is hexagonal). It will be understood that the multi-sided basin can include other number of sides including, for example, three, four five, seven, eight, nine, ten, eleven, twelve, or more sides.

The illustrated top mount receptacle 121 is configured to receive a device mount in two different ways, and from two different directions. The top mount receptacle 121 can receive device mounts with retention elements suitable for sliding onto the base between the opposing rails 441a, 441b. Additionally, the top mount receptacle 121 can receive device mounts with retention elements suitable for inserting into the retention aperture 461.

Figure 4C:
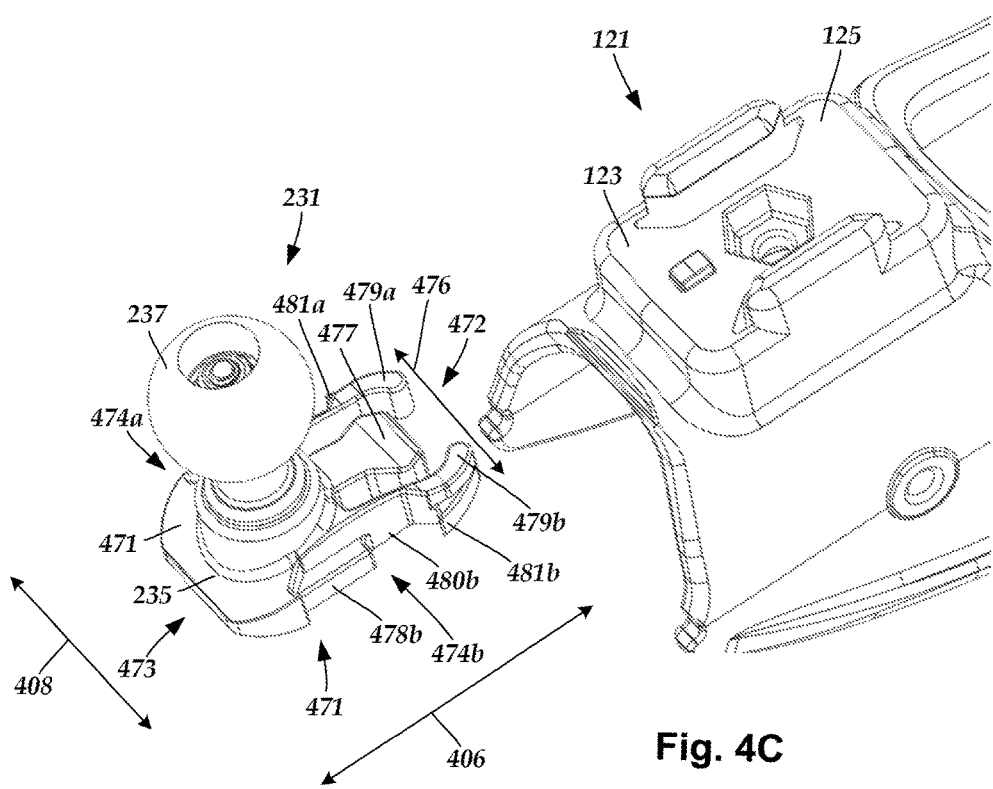
FIG. 4C is a schematic close-up perspective view of one embodiment of the top mount receptacle of FIG. 4A and the device mount of FIG. 2A, according to the invention.

FIG. 4C shows, in close-up perspective view, the device mount 231 in a position suitable for mounting to the top mount receptacle 121 by sliding the device mount 231 relative to the top mount receptacle 121 in a direction that is parallel to the mounting surface 125 of the base 123. In the illustrated embodiment, the retention element 235 of the device mount 231 is configured and arranged for sliding over the mounting surface 125 of the top mount receptacle 121 between the two rails 441a, 441b with a least a portion of the retention element 235 disposed beneath the bottom surfaces 455a, 455b of the two beams 451a, 451b of the top mount receptacle 121.

The retention element 235 includes a flange 471 having a length 406 and a width 408. The flange 471 includes a front-loading portion 472 and an opposing rear portion 473. Two opposing side portions 474a, 474b extend along the length 406 dimension and connect the front-loading portion 472 to the rear portion 473. The length 406 of the flange 471 is larger than the gap 447 between the two rails 441a, 441b of the top mount receptacle 121. The width 408 of the flange 471 is variable, with the front-loading portion 472 and the rear portion 473 being larger than the gap 447 between the two rails 441a, 441b, while an intermediate portion of the flange 471 between the front-loading ace 472 and the rear portion 473 includes cutouts 480a, 480b (only cutout 480b is visible in FIG. 4C) that form a portion of the flange 471 where the width 408 is smaller than the gap 447 between the two rails 441a, 441b. As described below, the width 408 of the flange 471 at the front-loading portion 472 is variable and can be transitioned to be smaller than the gap 447 between the two rails 441a, 441b, thereby enabling the flange 471 to pass between the two rails 441a, 441b and be retained by the top mount receptacle 121. Accordingly, in at least some embodiments, the flange 471 can only pass between the rails 441a, 441b in one orientation, with the front-loading portion 472 entering the rails 441a, 441b first.

Two flexible arms 479a, 479b extend from the front-loading portion 472 along opposing sides of the central member 477. The flexible arms 479a, 479b are biased to remain unflexed without application of a force to cause the flexible arms to flex inwardly towards each other. Inward flexing of the flexible arms 479a, 479b transitions the flange 471 from a first position where the flexible arms 479a, 479b are unflexed to a second position where the flexible arms 479a, 479b are flexed. In at least some embodiments, the front-loading portion 472 includes an optional central member 477 extending outwardly from the front-loading portion 472 between the flexible arms 479a, 479b.

When the flexible arms 479a, 479b are unflexed (i.e., the flange 471 is in the first position) the width 408 of the front-loading portion 472 is larger than the gap 447 between the two rails 441a, 441b. When the flexible arms 479a, 479b are flexed inwardly (i.e., the flange 471 is in the second position) the width 408 of the front-loading portion 472 is smaller than the gap 447 between the two rails 441a, 441b, thereby enabling the flange 472 to slide between the two rails 441a, 441b of the top mount receptacle 121 and couple (e.g., snap-fit couple) with the top mount receptacle.

The force necessary to transition the flange 471 from the first position to the second position can occur by pressing the flange 471 against an end of the two rails 441a, 441b of the top mount receptacle 121 in the direction shown by directional arrows 233 and 333. In at least some embodiments, the flexible arms 479a, 479b unflex (i.e., the flange 471 transitions back to the first position) when the flange 471 is fully received by the top mount receptacle 121 (e.g., a snap-fit coupling).

In at least some embodiments, distal tips of the flexible arms 479*a*, 479*b* include barbs 481*a*, 481*b*, respectively. The barbs 481*a*, 481*b* extend outwardly, away from the each other to prevent the flange 471 from sliding rearward when fully received by the top mount receptacle 121.

Shoulders 478*a*, 478*b* are disposed in the cutouts 480*a*, 480*b* (only shoulder 478*b* and cutout 480*b* are visible in FIG. 4C). The width 408 of the flange 471 between the shoulders 478*a*, 478*b* is less than the gap 447 between the two rails 441*a*, 441*b*, while the width 408 of the rear portion 473 is larger than the gap 447 between the two rails 441*a*, 441*b*, thereby prevent the flange 471 from sliding forward when fully received by the top mount receptacle 121.

Accordingly, when the flange 471 is received by the top mount receptacle 121, the flange 471 is prevented from moving relative to the top mount receptacle until the flexible arms 479*a*, 479*b* are reflexed (i.e., transitioning the flange 471 to the second position) to enable the barbs 481*a*, 481*b* to pass between the rails 441*a*, 441*b* as the flange 471 is slid rearwardly relative to the top mount receptacle 121.

Figure 4D:
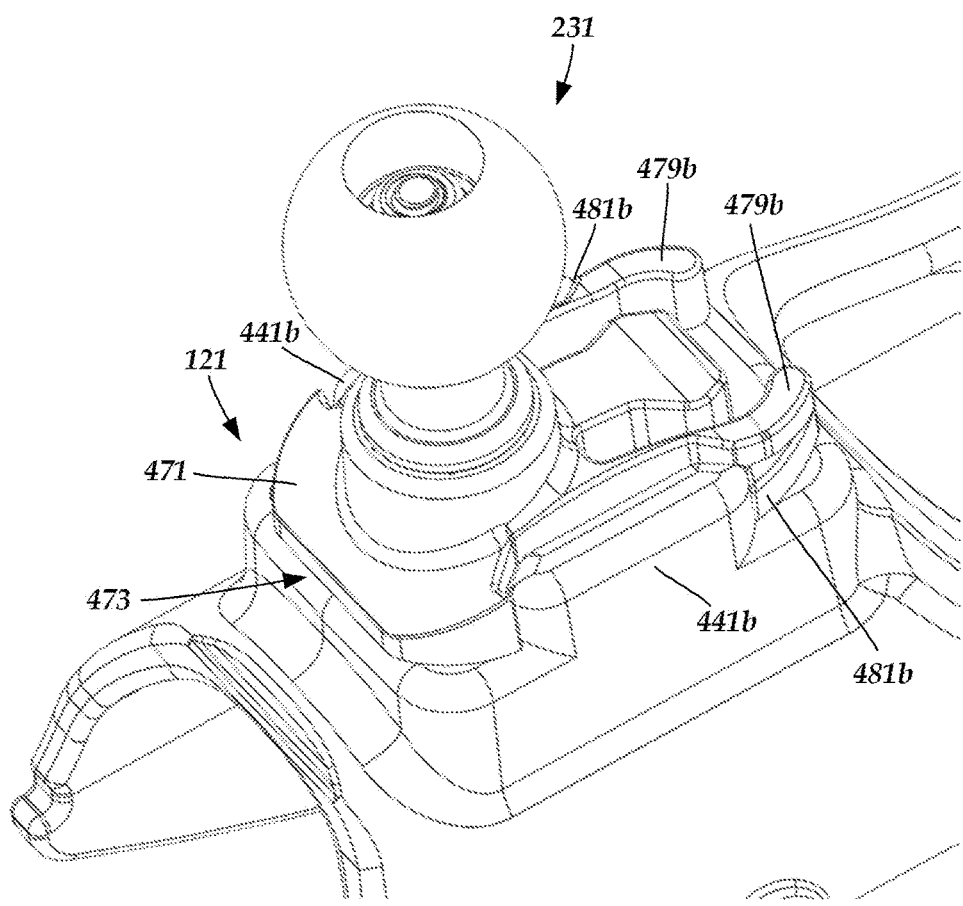
FIG. 4D is a schematic close-up perspective view of one embodiment of the device mount of FIG. 4A received by the top mount receptacle of FIG. 4A, according to the invention.

FIG. 4D shows, in perspective view, the device mount 231 received by the top mount receptacle 121. The shoulders of the flange 471 are disposed between the rails 441*a*, 441*b*, the mounting surface, and the bottom surfaces of the beams, thereby preventing the flange 471 from moving sideways, down, or up relative to the mounting receptacle 121. Additionally, the flange 471 is prevented from sliding forward relative to the mounting receptacle 121 by the rear portion 473 of the flange 471 having a width 408 that is larger than the gap 447 between the two rails 441*a*, 441*b*; and prevented from sliding backwards relative to the mounting receptacle 121 by barbs 481*a*, 481*b* without re-flexing the flexible arms 479*a*, 479*b* (i.e., transitioning the flange 471 to the second position) to enable the barbs 481*a*, 481*b* to slide rearwardly relative to the top mount receptacle 121, between the rails 441*a*, 441*b*.

Figure 5:
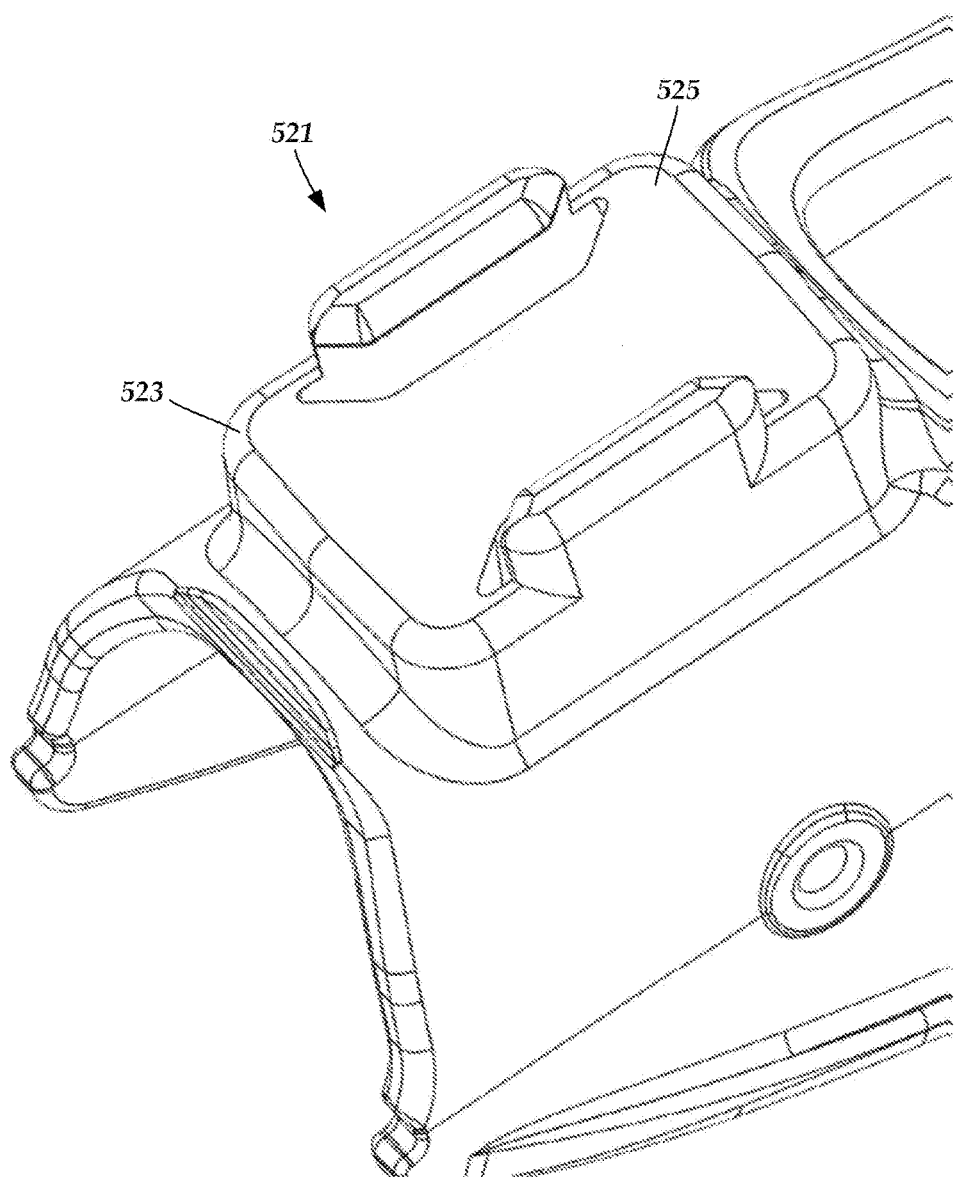
FIG. 5 is a schematic close-up perspective view of another embodiment of the top mount receptacle of FIG. 4A, according to the invention.
Figure 6:
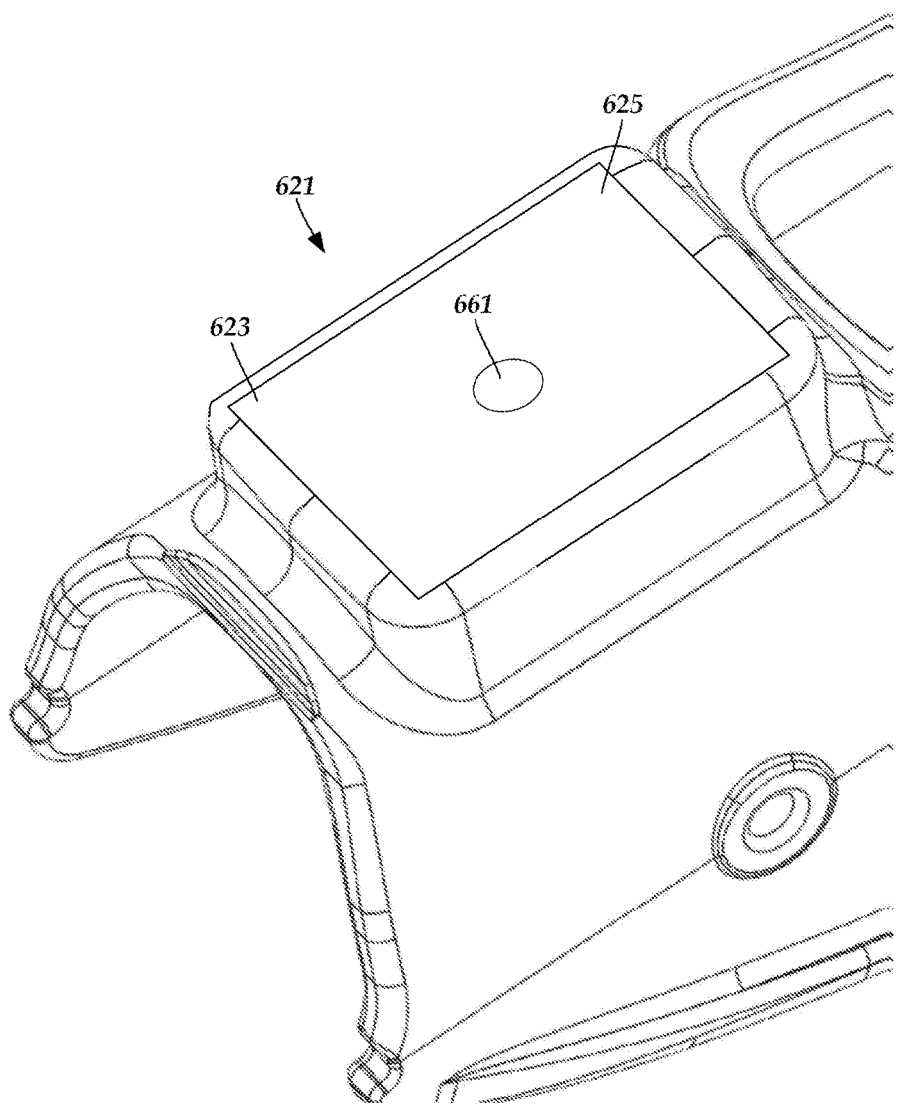
FIG. 6 is a schematic close-up perspective view of yet another embodiment of the top mount receptacle of FIG. 4A, according to the invention.

Turning to FIGS. 5 and 6, in some embodiments top mount receptacles are configured to receive device mounts by sliding the device mounts relative to the top mount receptacles in a direction that is parallel to the mounting surfaces of the top mount receptacles and retaining retention elements of the device mounts between rails of the device mounts, as described above with reference to FIGS. 2A-4D.

In other embodiments, top mount receptacles are configured to receive device mounts in a direction that is perpendicular to the mounting surfaces of the top mount receptacles and retaining retention elements of the device mounts within retention apertures defined in the bases and extending from the mounting surfaces of the top mount receptacles.

The mounting receptacle 121 includes rails/beams and a retention aperture. Accordingly, the mounting receptacle 121 is configured to receive a device mount either by moving the device mount parallel to the mounting surface or by moving the device mount perpendicular to the mounting surface.

In other embodiments, the top mount receptacle is configured to receive the device mount solely by moving the device mount parallel to the mounting surface of the device mount. FIG. 5 shows, in perspective view, a top mount receptacle 521 having a base 523 with a mounting surface 525 that are similar to the top mount receptacle 121, described above. The top mount receptacle 521 illustrated in FIG. 5, however, does not define a retention aperture, such as the retention aperture 461 of FIGS. 4A-4B, extending into the base 523 from the mounting surface 525. Accordingly, the mounting receptacle 521 is configured to receive any suitable device mount with a retention element that includes the flange 471.

Turning to FIG. 6, in some embodiments the mounting receptacle is configured to receive the device mount solely in a direction that is perpendicular to the mounting surfaces of the top mount receptacles and retain received retention elements of the device mounts within retention apertures defined in the bases and extending from the mounting surfaces of the top mount receptacles.

FIG. 6 shows, in perspective view, a top mount receptacle 621 having a base 623 with a retention aperture 661 defined in the mounting surface 625 and extending into the base 623. The top mount receptacle 621 illustrated in FIG. 6 does not include rails or beams, such as rails 441*a*, 441*b* or beams 451*a*, 451*b* of FIGS. 4A-4B, extending from the base 623. Accordingly, the mounting receptacle 621 is configured to receive any suitable device mount with a retention element that includes a device-mount base suitable for inserting into the retention aperture 661.

The retention aperture 661 may, optionally, include an element for preventing the device mount from rotating relative to the top mount receptacle when the device mount is received by the top mount receptacle. In at least some embodiments, the retention aperture 661 includes a multi-sided basin, such as multi-sided basin 462 in FIG. 4B. In at least some embodiments, the top mount receptacle 621 includes a different element or feature suitable for preventing rotation of the device mount relative to the top mount receptacle.

Figure 7A:
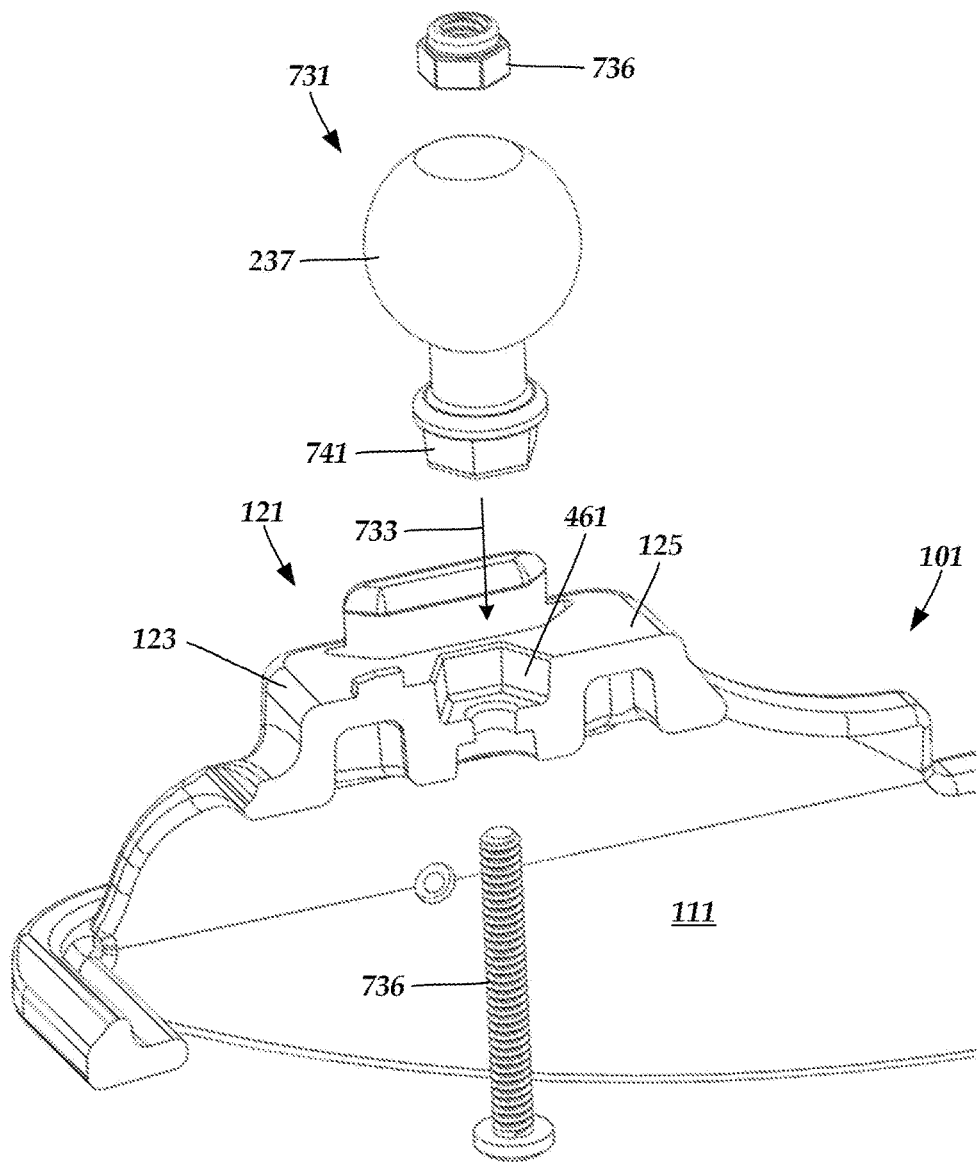
FIG. 7A is a schematic perspective cross-sectional view of one embodiment of the fishing rod holder of FIG. 1 and another embodiment of a device mount suitable for mounting to the top mount receptacle of the fishing rod holder, according to the invention.
Figure 7B:
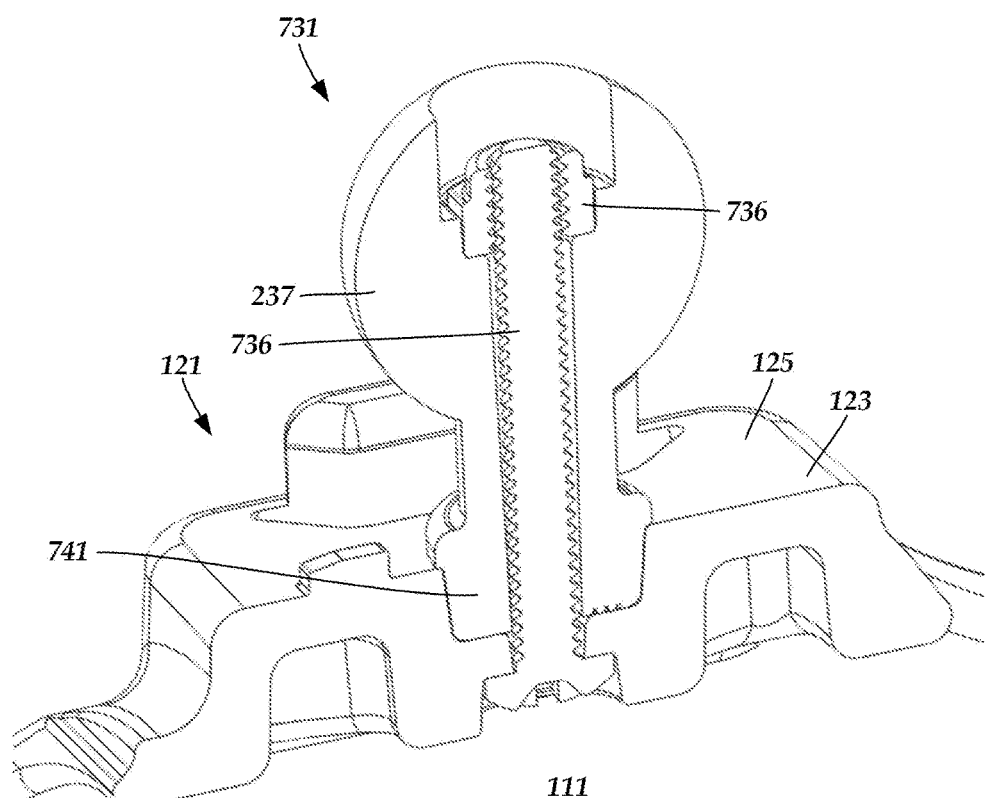
FIG. 7B is a schematic perspective cross-sectional view of one embodiment of the device mount of FIG. 7A received by the fishing rod holder of FIG. 1, according to the invention.

FIG. 7A shows, in perspective cross-sectional view, one embodiment of a portion of the fishing rod holder 101 that includes the top mount receptacle 121 and a device mount 731 suitable for mounting to the top mount receptacle 121. FIG. 7B shows, in perspective cross-sectional view, the device mount 731 received by the top mount receptacle 121. The device mount 731 is insertable into the top mount receptacle 121 by moving the device mount 731 relative to the top mount receptacle 121 in a direction that is perpendicular, or approximately perpendicular, to the mounting surface 125 of the base 123, as indicated by directional arrow 733.

The device mount 731 includes the mounting element 237 and a retention element 735. The device mount 731 may, optionally, include a device-mount base 741 coupled to the mounting element 237. The device-mount base 741 is configured and arranged for insertion into the retention aperture 461 defined in the top mount receptacle 121. In FIGS. 7A-7B, the device-mount base and retention aperture both include optional multi-sided surfaces to prevent rotation of the device mount 731 relative to the top mount receptacle 121 when the device mount 731 is received by the top mount receptacle 121.

In FIGS. 7A-7B, the retention element 736 is formed as a bolt that extends through the retention aperture 461 and device-mount base 741 from the inner cavity 111 of the fishing rod holder 101. In at least some embodiments, the retention element 735 extends into at least a portion of the mounting element 237. In at least some embodiments, the retention element 735 extends through the mounting element 237 and mates with a nut 736 insertable into a basin defined along a surface of the mounting element 237. As shown in FIGS. 7A-7B, in some embodiments the device-mount base 741 of the device mount 731 is inserted into the retention aperture 461 of the top mount receptacle 121 to prevent rotation of the device mount 731 relative to the top mount receptacle 121, while the retention element 735 prevents the device mount 731 from detaching from the top mount receptacle 121.

Figure 7C:
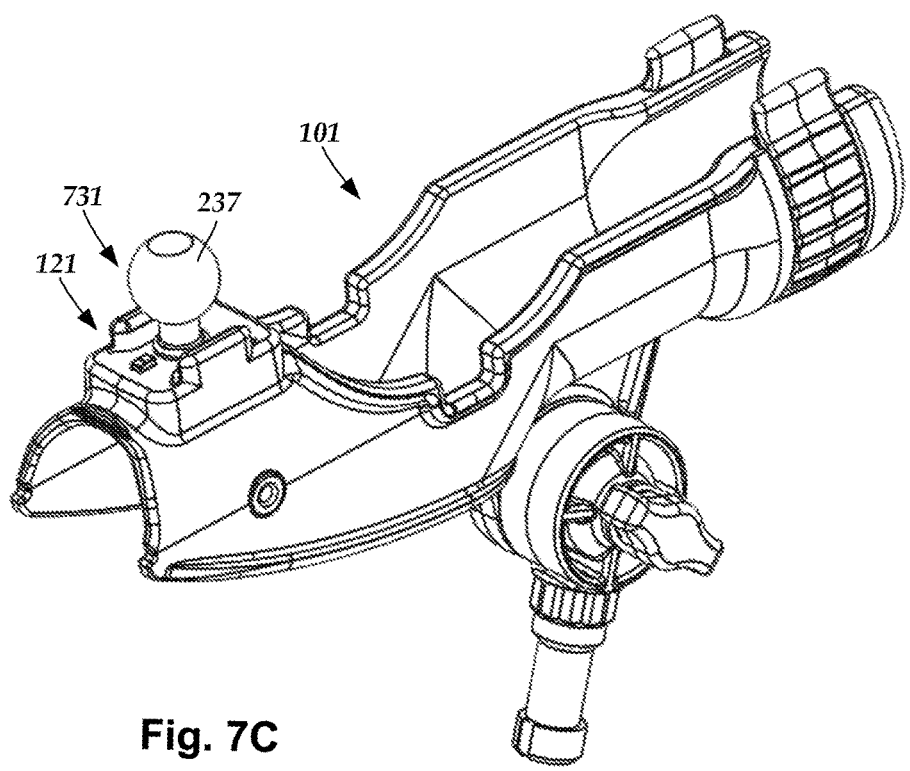
FIG. 7C is a schematic perspective view of one embodiment of the device mount of FIG. 7A received by the fishing rod holder of FIG. 1, according to the invention.

FIG. 7C shows, in perspective view, one embodiment of the device mount 731 received by the top mount receptacle 121 of the fishing rod holder 101. It will be understood that the device mount 731 can also be received by the top mount receptacle 621 of FIG. 5B.

Figure 8:
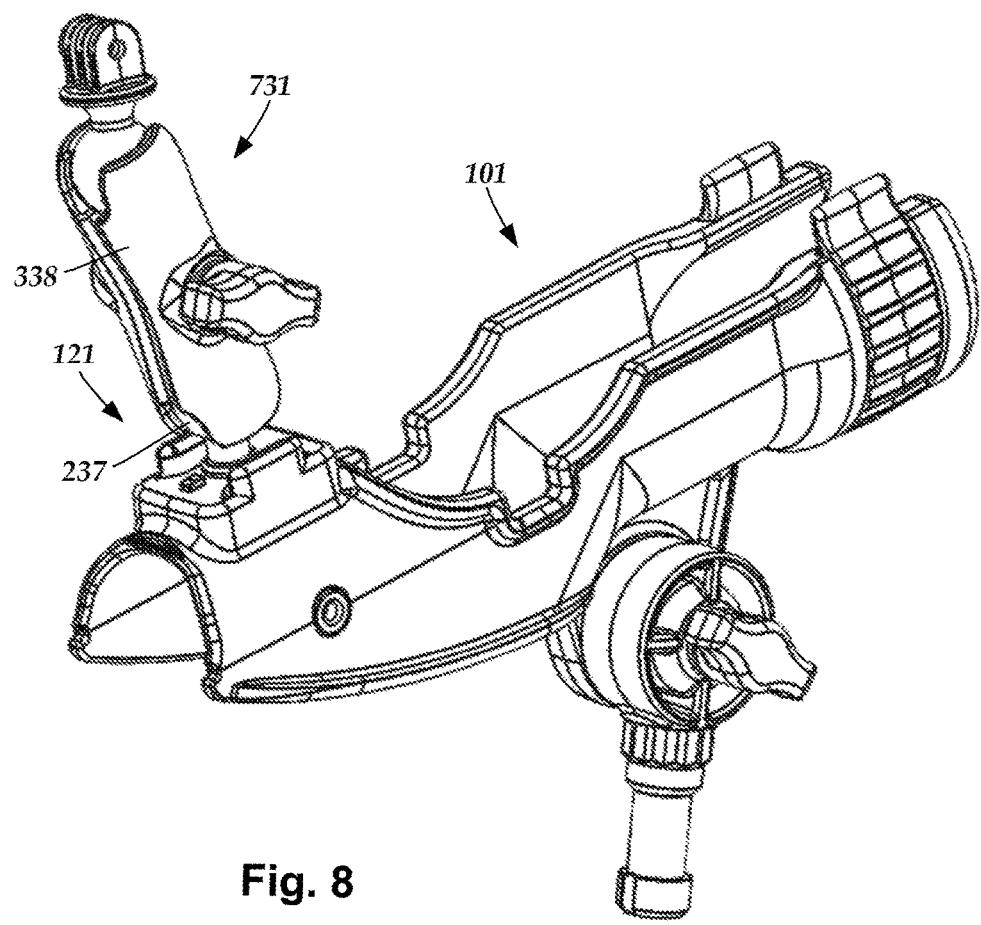
FIG. 8 is a schematic perspective view of another embodiment of the device mount of FIG. 7A with an attachment arm coupled to a mounting element of the device mount, according to the invention.

The device mount 731 can, optionally, include one or more attachments coupled to the mount. FIG. 8 shows, in perspective view, another embodiment of the device mount 731 received by the top mount receptacle 121 of the fishing rod holder 101. As shown in FIG. 8, the retention element 735 is configured for being received by the top mount receptacle 121. In FIG. 8 (and in other figures), the attachment arm 338 is coupled to the mounting element 237. The attachment arm 338 can be used to couple to one or more items, such as an electronic devices electronic device (e.g., camera, phone, laptop, tablet, fish finder, positioning device, music player, or the like).

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A fishing rod holder, comprising:
   a mounting arrangement configured and arranged to either be received by a mounting apparatus or to mount to a surface;
   a rod retainer coupled to the mounting arrangement, the rod retainer comprising at least one retaining wall having an outer surface and defining an inner cavity configured and arranged to receive and hold a portion of a fishing rod; and
   a top mount receptacle configured and arranged to receive a device mount, the top mount receptacle comprising a base disposed on the outer surface of the rod retainer, the base comprising a mounting surface configured and arranged for receiving a portion of the device mount.

2. The fishing rod holder of claim 1, wherein the top mount receptacle defines a retention aperture extending from the mounting surface into the base, the retention aperture configured and arranged to receive a portion of the device mount.

3. The fishing rod holder of claim 2, wherein the retention aperture comprises a polygonal basin configured and arranged to resist rotation of the device mount relative to the top mount receptacle when the device mount is received by the retention aperture.

4. The fishing rod holder of claim 1, wherein the top mount receptacle further comprises two rails extending opposite each other from the base, the two rails laterally spaced apart from each other by a first distance.

5. The fishing rod holder of claim 4, wherein the top mount receptacle further comprises two beams, wherein each of the beams has a top surface and an opposing bottom surface, wherein each of the beams extends from a different one of the rails over the base toward the other beam, wherein the beams are laterally spaced apart from each other by a second distance that is smaller than the first distance.

6. The fishing rod holder of claim 5, wherein the top mount receptacle defines a retention aperture extending from the mounting surface into the base, the retention aperture configured and arranged to receive a retention element of the device mount.

7. A fishing-rod-holder kit, comprising:
   the fishing rod holder of claim 5; and
   a device mount configured and arranged to mount to the top mount receptacle of the fishing rod holder, the device mount comprising
      a retention element configured and arranged to removably couple with the top mount receptacle of the fishing rod holder, and
      a mounting element coupleable to the retention element.

8. The fishing-rod-holder kit of claim 7, wherein the retention element is configured and arranged to form a snap-fit coupling with the top mount receptacle.

9. The fishing-rod-holder kit of claim 7, wherein the retention element is configured and arranged to slide over the mounting surface of the top mount receptacle between the two rails with a portion of the retention element disposed beneath the bottom surfaces of the two beams of the top mount receptacle.

10. The fishing-rod-holder kit of claim 9, wherein the retention element comprises a flange with two flexible arms extending from the flange, the two flexible arms each configured and arranged to flex inwardly from an unflexed position towards the other flexible arm during coupling of the retention element with the top mount receptacle, the inward flexing of the two flexible arms enabling the retention element to slide over the mounting surface of the top mount receptacle between the two rails.

11. The fishing-rod-holder kit of claim 10, wherein the flexible arms are biased to remain in the unflexed position absent application of a force to the flexible arms.

12. The fishing-rod-holder kit of claim 11, wherein the flexible arms are in the unflexed position when the retention element is received by top mount receptacle.

13. The fishing-rod-holder kit of claim 7, wherein the top mount receptacle defines a retention aperture extending from the mounting surface into the base, the retention aperture configured and arranged to receive the retention element of the device mount.

14. The fishing-rod-holder kit of claim 13, wherein the device mount further comprises a device-mount base configured and arranged to insert into the retention aperture of the device mount and to receive the retention element.

15. The fishing-rod-holder kit of claim 7, wherein the mounting element is a ball mount.

16. A method of mounting a device mount to a fishing rod holder, the method comprising
   providing the fishing-rod-holder kit of claim 7; and
   sliding the retention element of the device mount along the mounting surface of the base between the two rails to retain a portion of the retention element between the mounting surface, the two rails, and the bottom surfaces of the two beams.

17. The method of claim 16, wherein sliding the retention element of the device mount along the mounting surface of the base between the two rails comprises forming a snap-fit coupling between the retention element and the top mount receptacle.

18. A fishing-rod-holder kit, comprising:
   the fishing rod holder of claim 2; and
   a device mount configured and arranged to mount to the top mount receptacle of the fishing rod holder, the device mount comprising
      a retention element configured and arranged to extend into the retention aperture of the fishing rod holder, and a mounting element coupleable to the retention element.

19. The fishing-rod-holder kit of claim 18, wherein the device mount further comprises a device-mount base configured and arranged to insert into the retention aperture of the top mount receptacle and to receive the retention element.

20. A method of mounting a device mount to a fishing rod holder, the method comprising
- providing the fishing-rod-holder kit of claim 18; and
- inserting the retention element of the device mount into the retention aperture of the top mount receptacle.

* * * * *